(12) United States Patent
Tsuchiya et al.

(10) Patent No.: US 6,366,431 B1
(45) Date of Patent: Apr. 2, 2002

(54) HEAD SUPPORTING ARM HAVING LASER BEAM EXPOSING APERTURE

(75) Inventors: Tatsumi Tsuchiya, Ayase; Tatsushi Yoshida, Chigasaki; Hiroyoshi Yokome; Naoki Fujii, both of Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,995

(22) Filed: Nov. 1, 1999

(30) Foreign Application Priority Data

Dec. 25, 1998 (JP) .......................................... 10-370272

(51) Int. Cl.⁷ ................................................ G11B 5/48
(52) U.S. Cl. ..................................... 360/245; 360/245.3
(58) Field of Search ............................. 360/244.2, 245, 360/245.8, 246.4, 245.1, 245.2, 245.3, 245.4, 245.5, 245.6, 245.7, 244.7, 234.6, 244.9

(56) References Cited

U.S. PATENT DOCUMENTS

| 5,333,085 | A | * | 7/1994 | Prentice et al. | 360/245.7 |
| 5,467,236 | A | * | 11/1995 | Hatanai et al. | 360/234.6 |
| 5,499,153 | A | * | 3/1996 | Uemura et al. | 360/234.6 |
| 5,526,205 | A | * | 6/1996 | Aoyagi et al. | 360/244.2 |
| 5,636,088 | A | * | 6/1997 | Yamamoto et al. | 360/245.1 |
| 5,771,137 | A | * | 6/1998 | Nagase | 360/246.1 |
| 5,774,305 | A | * | 6/1998 | Boutaghou | 360/245.4 |
| 5,877,923 | A | * | 3/1999 | Khan et al. | 360/244.9 |
| 5,886,857 | A | * | 3/1999 | Symons et al. | 360/245.2 |
| 5,889,914 | A | * | 3/1999 | Gentsu | 385/137 |
| 5,936,806 | A | * | 8/1999 | Pan et al. | 360/234.6 |
| 6,115,220 | A | * | 9/2000 | Khan et al. | 360/244.2 |
| 6,151,197 | A | * | 11/2000 | Larson et al. | 360/255 |
| 6,172,853 | B1 | * | 1/2001 | Davis et al. | 360/245.7 |
| 6,215,625 | B1 | * | 4/2001 | Carlson | 360/244.7 |

* cited by examiner

*Primary Examiner*—Craig A. Renner
*Assistant Examiner*—Franklin D. Altman, III
(74) *Attorney, Agent, or Firm*—Douglas R. Millett

(57) ABSTRACT

The object of the present invention is to provide a structure of a head supporting arm for preventing a read/write head from being damaged during a heating process for bonding a slider to a flexure and a method for fabricating the head supporting arm with preventing the read/write head from being damaged during the heating process. A head supporting arm of the present invention comprises: a load beam, a flexure including a portion coupled to said load beam and a bonding portion; and a slider bonded on said bonding portion by an adhesive; wherein said bonding portion of said flexure includes an edge placed on a surface of said slider; and wherein an exposing aperture, which exposes both a portion of a surface region, including said one edge, of said bonding portion and a portion of said surface of said slider, is formed on said load beam.

23 Claims, 13 Drawing Sheets

HEAD SUPPORTING ARM HAVING LASER BEAM EXPOSING APERTURE

BACKGROUND OF THE INVENTION

1. Field of the Invention

The present invention relates to a head supporting arm and a method for fabricating it. More particularly, the present invention relates to a structure of a head supporting arm for preventing a read/write head from being damaged during a heating process for bonding a slider to a flexure and relates to a method for fabricating the head supporting arm while preventing the read/write head from being damaged during the heating process.

2. Description of the Prior Art

In an assembly or a fabrication of a head supporting arm used in a magnetic data recording device, such as a hard disk drive device, a very small slider, a read/write head is attached, or bonded to a flexure by an adhesive, such as a thermosetting resin. FIG. 1 shows a prior head supporting arm 1 which includes an actuator arm 2 which has a pivot point 3 mounted on a frame of the hard disk drive device, a load beam 4, a mount plate 5 connecting the load beam 4 with the actuator arm 2, a flexure 6 attached to the load beam 4, and a slider 7 mounted on the flexure 6. The mount plate 5 and the actuator arm 2 are coupled by a swaging connection 8. The slider 7, the flexure 6, the load beam 4 and the mount plate 5 are called as a head gimbal assembly (HGA).

A flexible tube 9 containing four connecting wires 10 connected to a read/write head 13, such as a MR head, shown in FIG. 2, on the slider 7 is mounted on one of the side edges of the head supporting arm. The tube 9 is fixed to the side edge at plural positions by fixing elements 11. This type of head supporting arm is used in a contact start stop (CSS) scheme in which the slider 7 is landed on an outer landing zone of the surface of a data recording disk, such as a hard disk, when the rotation of the hard disk is stopped during a standby condition. When the rotation of the hard disk is started to read the data from the hard disk or to write the data onto the hard disk, the slider 7 takes off from the landing zone and flies above the hard disk.

The FIG. 2 shows a positional relationship of a front end of the load beam 4, the flexure 6 and the slider 7. A dimple 12 formed on the back surface of the load beam 4 contacts an upper surface of the flexure 6 to realize a gimbal action of the slider 7. In the assembling process, the flexure 6 is fixed on a back surface of the load beam 4, and the slider 7 is attached on a back surface of the flexure 6 by the thermosetting resin 15. The cure of the entire thermosetting resin is performed in an oven. Before the heating in the oven, a laser beam is applied in a small area 16 of the exposed area 14 of the flexure 6 to cure the thermosetting resin in the area 16 for tacking the slider 7 onto the flexure 6. This tack is called as a laser tack. Such laser tack becomes possible in the head supporting arm 1 used in the CSS scheme since the portion 16 is exposed in the such arm 1.

A load/unload scheme has been recently developed in which a member called as a ramp element is fixed at a position outside the hard disk. When the read/write operation is not performed, a front tab of the head supporting arm rides on the ramp element, and when the read/write operation is started, the head supporting arm is moved toward a center of the hard disk, whereby the front tab disengages from the ramp element and the slider flies on the hard disk.

FIGS. 3 and 4 show a prior head supporting arm 21 used in the load/unload scheme. The head supporting arm 21 includes an actuator arm 22 which has a pivot point 23 mounted on a frame of the hard disk drive device, a load beam 24, a mount plate 25 connecting the load beam 24 with the actuator arm 22, a flexure 26 attached to the load beam 24 at coupling points 17, and a slider 27 bonded on the flexure 26. The mount plate 25 and the actuator arm 22 are coupled by a swaging connection 28. A flexible tube 29 containing the four connecting wires 30 connected to the MR head 33 on a thin film 34 is mounted on one of side edges of the head supporting arm 21 by fixing elements 31. The load beam 24 is bent at a bending potion 18. A dimple 32 formed on the back surface of the load beam 24 contacts an upper surface of the flexure 24 to realize the gimbal action of the slider 27.

It is required in the head supporting arm used in the load/unload scheme to provide a front tab 19 on the load beam 24, which rides on the ramp element, not shown, at the standby condition, and to provide an aperture 20 in the load beam 24 through which the connecting wires 30 connected to terminals, not shown, on the thin film 34 pass. As a result, an area 35 exposed through the aperture 20 becomes small, as shown in the FIG. 4, and hence the laser tack technology used in the head supporting arm 1 shown in the FIGS. 1 and 2 can not be used. For this reasons, to bond the slider 27 onto a bonding portion 26A, called as a tongue, of the flexure 26, (1) an instant adhesive, such as a cyanoacrylate adhesive, is used, or (2), in the case of that the thermosetting adhesive is used, the bonding region 26A and the slider 27 fixed on a positioning jig are heated in the heating oven to cure the thermosetting adhesive. Such bonding scheme, however, causes new problems in that the productivity is degraded in the case (2), and a flying height of the read/write head varies depending upon the operating temperature in the housing of the hard disk drive device in the case (1). Such latter problem is caused by the following reasons. A glass transition temperature of the cyanoacrylate adhesive is relatively high, such as eighty degrees centigrade. Accordingly, the cyanoacrylate adhesive keeps its glassy state and indicates a relatively high Young's modulus in a temperature range below the glass transition temperature. When the temperature reaches the glass transition temperature, the state of the cyanoacrylate adhesive is changed to a rubber like elastic state and indicates a relatively low Young's modulus. That is, in the temperature range below the glass transition temperature, the slider 27 and the bonding portion 26A of the flexure 26 is firmly or integrally bonded through the glass like cyanoacrylate adhesive. Since a coefficient of expansion of the slider differs from that of the bonding portion 26A, a bimetal effect of the slider 27 and the bonding portion 26a occurs in the temperature range below the glass transition temperature, and such bimetal effect does not occur in the temperature range equal or higher than the glass transition temperature since the rubber like adhesive absorbs the change of expansion, so that the flying height of the read/write head varies in depending upon the operation temperature of the hard disk drive device. In the case that the hard disk drive device is operated in a severe operating atmosphere of a broader temperature range than the temperature range of a normal use, it is necessary to use a structure or material for decreasing the above bimetal effect.

SUMMARY OF THE INVENTION

One object of the present invention is to provide an improved head supporting arm for the data recording device operated in the load/unload scheme.

Another object of the present invention is to provide the data recording device including the improved head supporting arm operated in the load/unload scheme.

Another object of the present invention is to provide a method for fabricating or assembling the improved head supporting arm for the data recording device operated in the load/unload scheme.

A head supporting arm in accordance with the present invention comprises:

a load beam;

a flexure including a portion coupled to the load beam and a bonding portion;

a slider bonded on the bonding portion by an adhesive;

wherein the bonding portion of the flexure includes an edge placed on a surface of the slider; and wherein an exposing aperture, which exposes both a portion of a surface region, including the one edge, of the bonding portion and a portion of the surface of the slider, is formed on the load beam.

A dimple is formed on the load beam to provide a gimbal action of the flexure and the slider, and the exposing aperture is formed on the load beam at a position which is located between the dimple and one edge of the slider which is the opposite side to the other edge of the slider at which a read/write head is attached.

The exposing aperture is formed on the load beam at a position for exposing both a portion of a surface region including one edge of the bonding portion adjacent to the one edge of the slider and a portion of the surface of the slider.

A groove surrounding the portion of the bonding portion exposed by the exposing aperture is formed on the bonding portion.

The groove is formed on the surface of the bonding portion facing to the slider.

The groove is formed on the surface of the bonding portion facing to the load beam.

The groove extends along a semicircular path surrounding the portion exposed by the exposing aperture.

The groove extends along a half rectangular path surrounding the portion exposed by the exposing aperture.

A plurality of apertures surrounding the portion of the bonding portion exposed by the exposing aperture are formed on the bonding portion.

The plural apertures are formed along a semicircular path surrounding the portion exposed by the exposing aperture.

An island like portion including the portion exposed by the exposing aperture is extended from the bonding portion through a neck portion.

A data recording apparatus in accordance with the present invention comprises:

a data recording medium for recording data; and a head supporting arm relatively moved to the data recording medium;

the head supporting arm comprising:

a load beam;

a flexure including a portion coupled to the load beam and a bonding portion;

a slider bonded on the bonding portion by an adhesive;

wherein the bonding portion of the flexure includes edge placed on a surface of the slider; and wherein an exposing aperture, which exposes both a portion of a surface region, including the one edge, of the bonding portion and a portion of the surface of the slider, is formed on the load beam.

A method for fabricating a head supporting arm in accordance with the present invention comprises the steps of:

preparing a load beam to which a flexure including a bonding portion is attached, the load beam being formed with an exposing aperture, through a portion of an area of which a portion of a surface region including an edge of the bonding portion is exposed;

applying an thermosetting adhesive on the bonding portion;

positioning the slider to the thermosetting adhesive on the bonding portion to expose a portion of the surface of the slider through a remaining portion of the area of the exposing aperture; and directing a laser beam to the portion of the surface region of the bonding portion and the portion of the surface of the slider through the exposing aperture to cure the thermosetting adhesive.

DESCRIPTION OF THE PREFERRED EMBODIMENT

Figure 5:
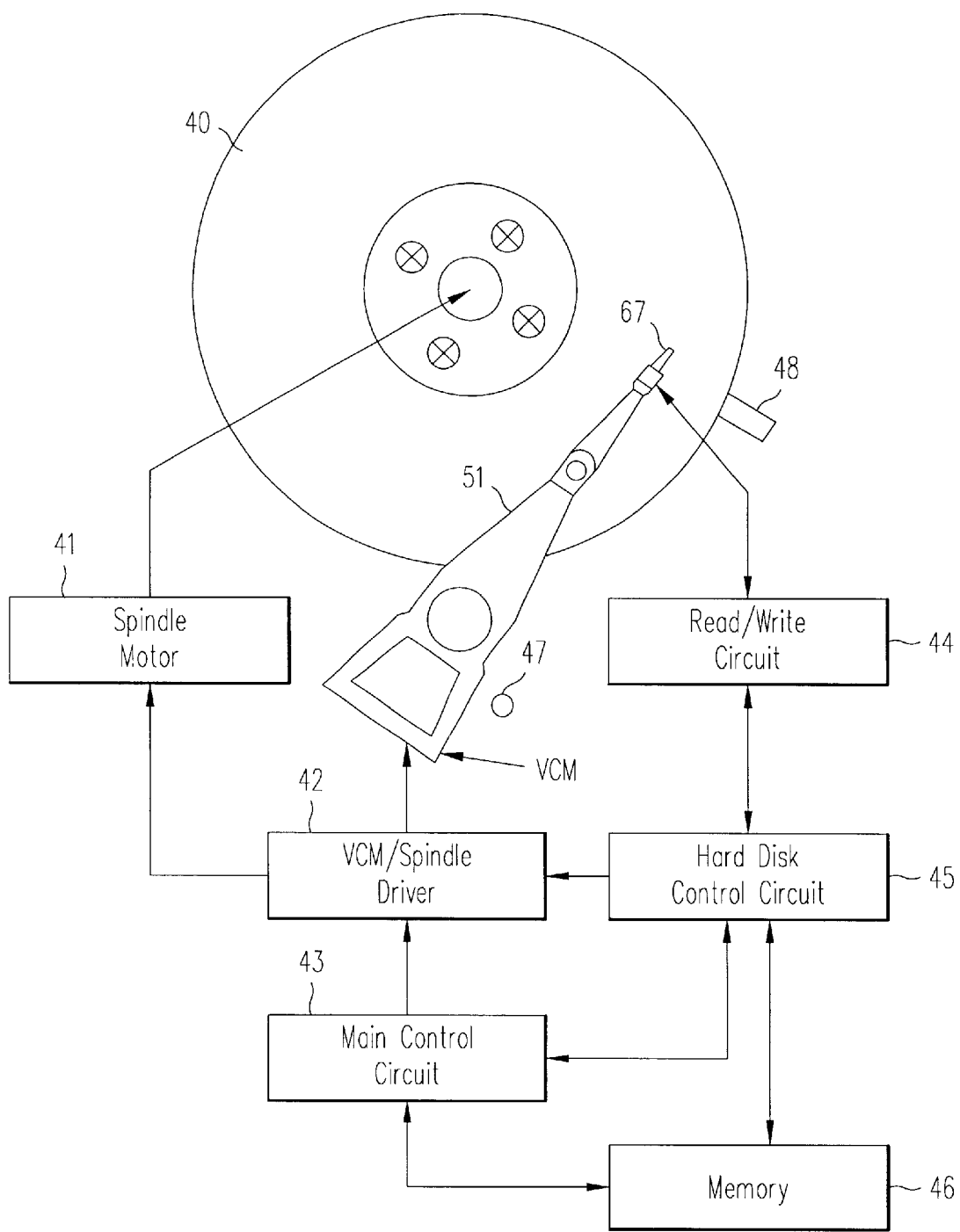
FIG. 5 shows a block diagram of the circuits of the hard disk drive device including the head supporting arm in accordance with the present invention.

The FIG. 5 shows a block diagram of the circuits of the hard disk drive device including the head supporting arm 51 in accordance with the present invention. A spindle motor 41 for rotating the magnetic data recording disk 40 and a voice coil motor (VCM) are controlled by a VCM/spindle driver 42. Only one magnetic recording disk 40 is shown for simplifying the drawing. A read/write circuit 44 is connected to a hard disk control circuit 45, which is also connected to the VCM/spindle driver 42. A memory 46 for storing data and control data is connected to the circuit 45 and a main control circuit or MPU 43, which controls the VCM/spindle driver 42, the hard disk control circuit 45 and the memory 46. The read/write head is mounted on the slider, not shown. The slider is mounted on the front portion of the head supporting arm 51. And, the rear end of the head supporting arm 51 is pivotally mounted on the frame of the hard disk drive device. An inner crash stop 47 is mounted on the frame to engage the head supporting arm 51 to position the read/write head on an inner most data recording track. A ramp element 48 is mounted on a frame of the hard disk drive device. The hard disk device is operated in the load/unload scheme in which a front tab 67 of the head supporting arm 51 rests on the ramp element 48 at the standby state, and when the read/write operation is started, the head supporting arm 51 is moved toward a center of the hard disk 40, whereby the front tab 67 disengages from the ramp element 48 and the slider and the read/write head flies on the hard disk 40.

Figure 6A:
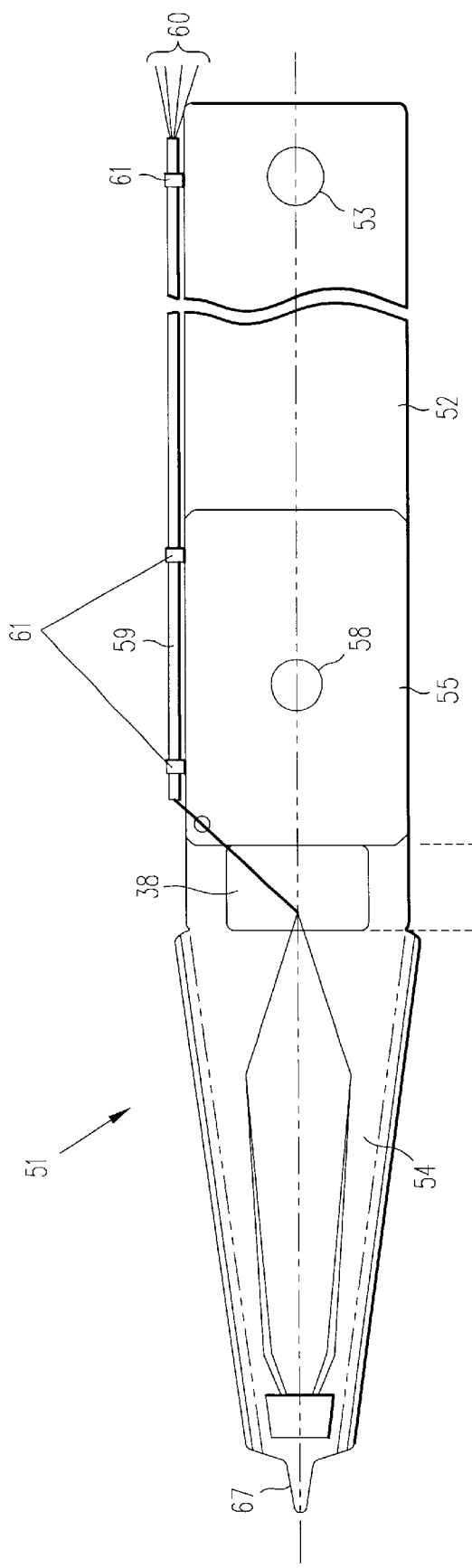
FIG. 6 shows an embodiment of the head supporting arm in accordance with the present invention.
Figure 6B:
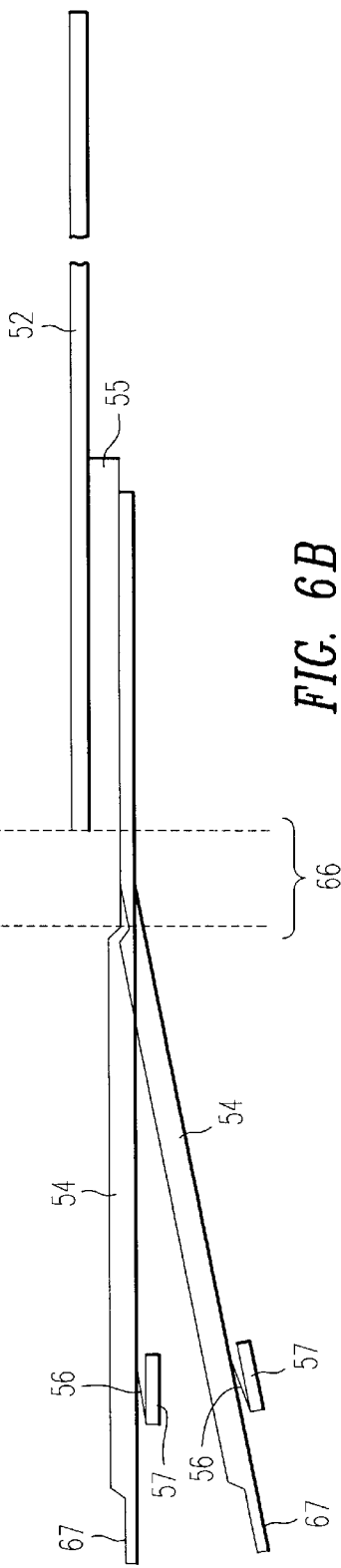
Figure 7A:
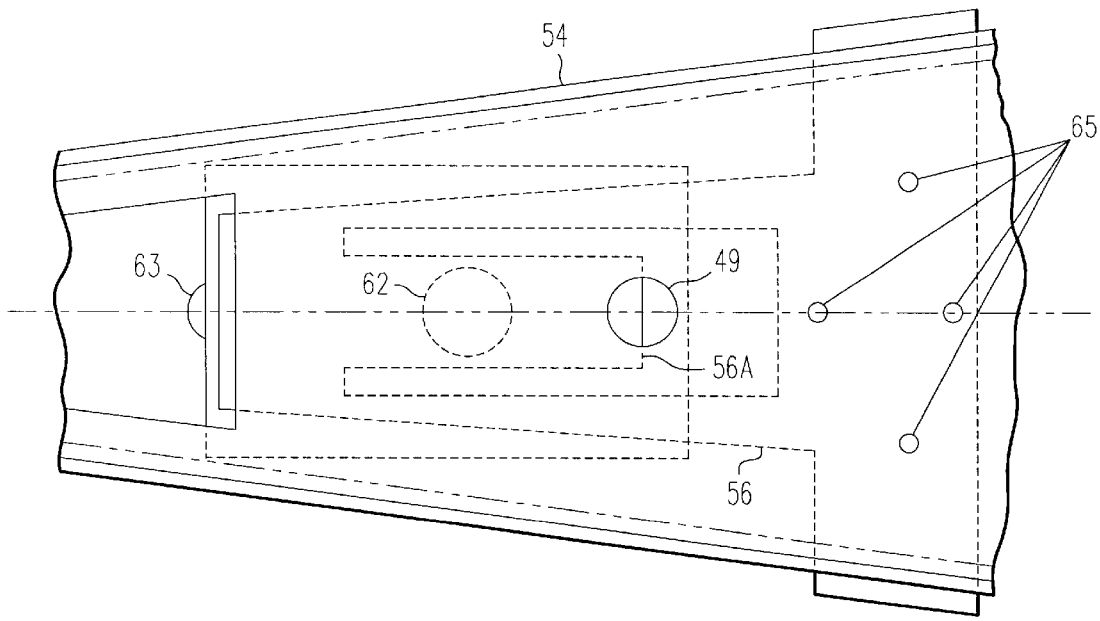
FIG. 7 shows details of the load beam, the flexure and the slider.
Figure 7B:
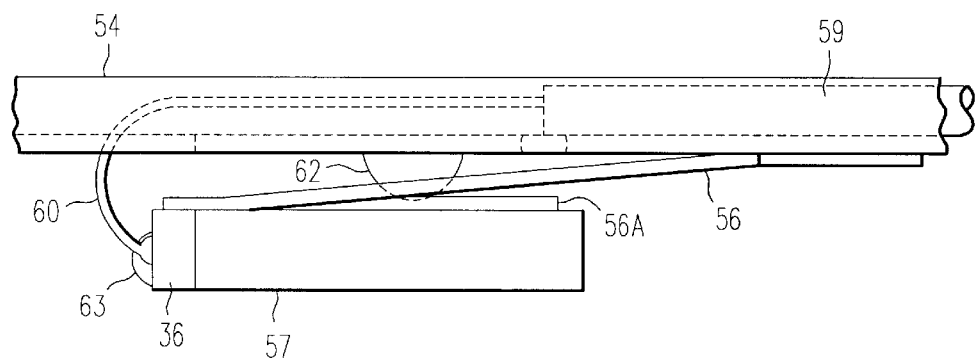

The FIG. 6 shows an embodiment of the head supporting arm 51 in accordance with the present invention, which contains an actuator arm 52 which has a pivot point 53 mounted on the frame of the hard disk drive device, a load beam 54, a mount plate 55 connecting the load beam 54 with the actuator arm 52, a flexure 56 attached to the load beam 54 at coupling points 65, as shown in FIG. 7, and a slider 57 mounted on a bonding portion 56A of the flexure 56. In this manner, a front portion of the head supporting arm 51 supports the slider 57 through the flexure 56, and a rear portion of the head supporting arm 51 is pivotally mounted on the frame of the hard disk drive device. The slider 57, the flexure 56, the load beam 54 and the mount plate 55 are called as the head gimbal assembly (HGA). The detail of the load beam 54, the flexure 56 and the slider 57 are shown in the FIGS. 7 and 8.

The read/write head 63, such as a MR head, is mounted on a thin film 36 attached on the front end of the slider 57 and has four connecting terminals, and the four electrically conductive connecting wires 60 are connected to the four terminals, respectively. The four connecting wires 60 are covered by a flexible tube 59. The tube 59 is fixed to the actuator arm 52 and the mount plate 55 by fixing elements 61. A dimple or extruded portion 62 on the load beam 54 contacts the bonding portion 56A of the flexure 56 supporting the slider 57 and the read/write head 63 to realize the gimbal type movement of the slider 57 and the head 63. An aperture 38 is formed in the load beam 54 to define a bending portion 66 of the load beam 54. The load beam 54 is moved between the two position by bending at the bending portion 66, as shown in FIG. 6(B).

The FIG. 7 shows details of the load beam 54, the flexure 56 and the slider 57. The connecting wires 60 are not shown in the FIG. 7(A). Substantially all surface of the bonding portion 56A of the flexure 56 facing to the lower surface of the load beam 54 is hidden by the load beam 54 when the upper surface of the load beam 54 is viewed in a direction toward the upper surface. In accordance with the present invention, an aperture 49 is formed on the load beam 54, which is used to pass the laser beam to both the bonding portion 56A of the flexure 56 and slider 57.

Figure 8:
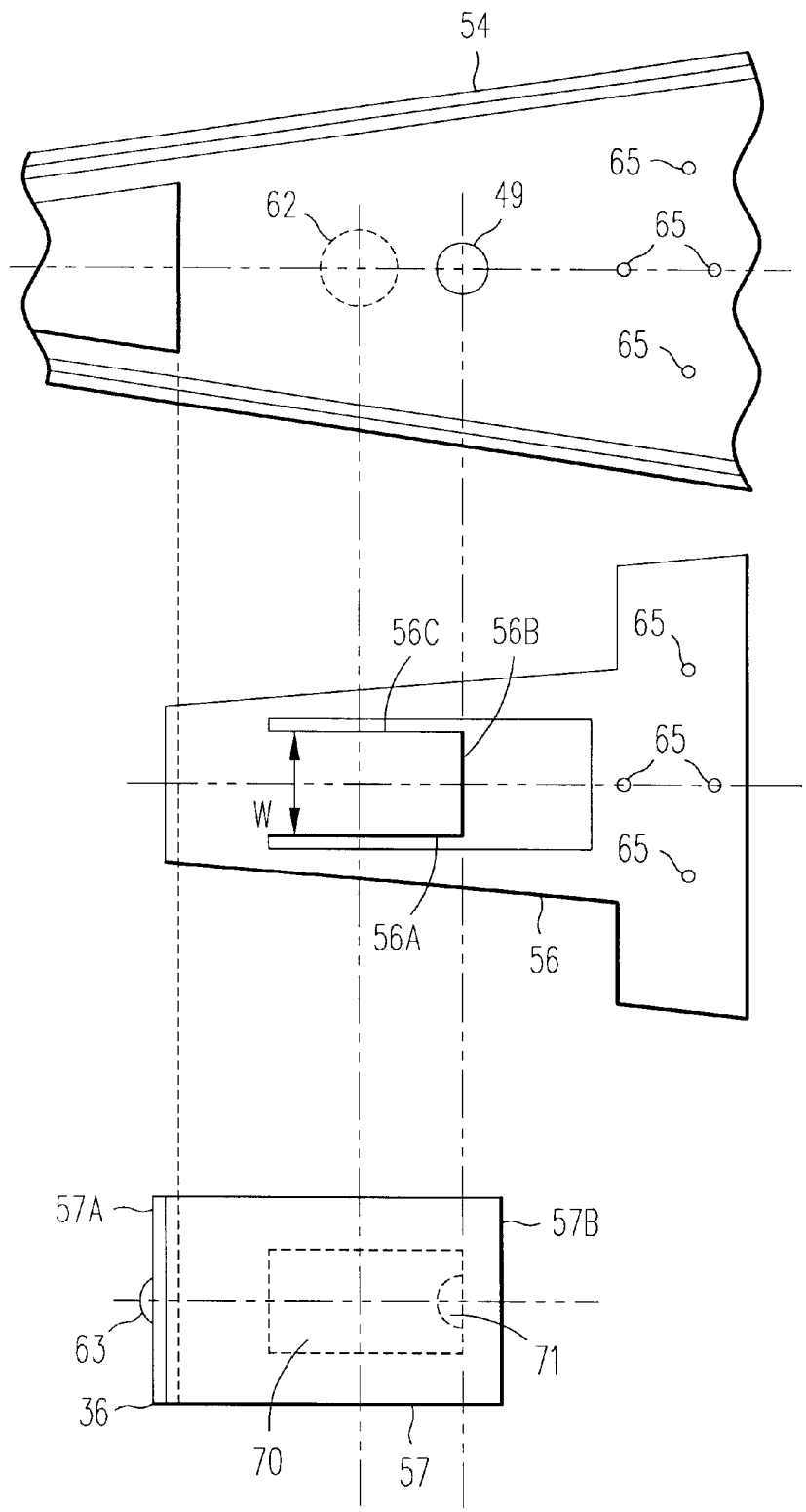
FIG. 8 shows a positional relationship of the load beam, the flexure and the slider.

FIG. 8 shows a positional relationship of the load beam 54, the flexure 56 and the slider 57. In this specification, the surfaces of the load beam 54, the flexure 56 and the slider 57 facing to the data recording disk are called as lower surfaces, and the surfaces opposing to the lower surfaces of them are called as upper surfaces. An edge 56B of the bonding portion 56A of the flexure 56 is placed on the upper surface of the slider 57. Describing the position of the aperture 49 on the load beam 54, the position of the aperture 49 is defined as a position satisfying the following condition (1) and (2). That is, (1) the aperture 49 is formed at the position which exposes both a portion of a surface region, including one edge 56B of the bonding portion 56A and a portion of the upper surface of the slider, and (2) the aperture 49 is formed at the position which is located between the dimple 62 and an edge 57B of the slider 57 which is the opposite side to an edge 57A of the slider 57 at which the read/write head 63 is attached, as shown in the FIGS. 7(A) and 8. The meritorious effect of the aperture 49 formed at the above position will be described later.

Figure 9:
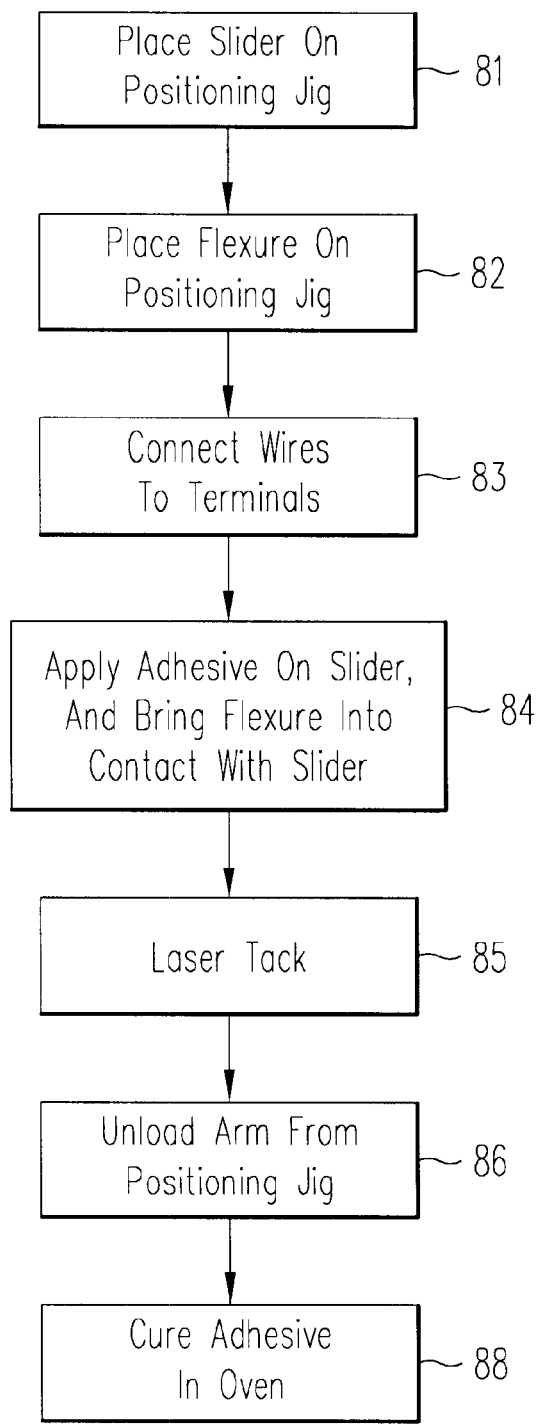
FIG. 9 shows the fabrication steps for bonding the slider onto the bonding portion of the flexure.

The method for bonding the slider 57 onto the bonding portion 56A of the flexure 56 is described with reference to the FIG. 8 and FIGS. 9 and 10. The FIG. 9 shows the fabrication steps for bonding the slider 57 onto the bonding portion 56A of the flexure 56. The FIG. 10 shows the positional relationship of the slider 57, the flexure 56 and the load beam 54 positioned in a positioning jig. Since such positioning jig is well known in the art, it is not shown in the FIG. 10.

Before a step 81 shown in the FIG. 9, the actuator arm 52, the mount plate 55 and the load beam 54 are integrally assembled, and the flexure 56 is attached to the load beam 54 at the fixing points 65. It is noted that the flexure 56 is integrally formed with a frame member 73, and the frame member 73 is separated at cutout portions 72 later.

Figure 10A:
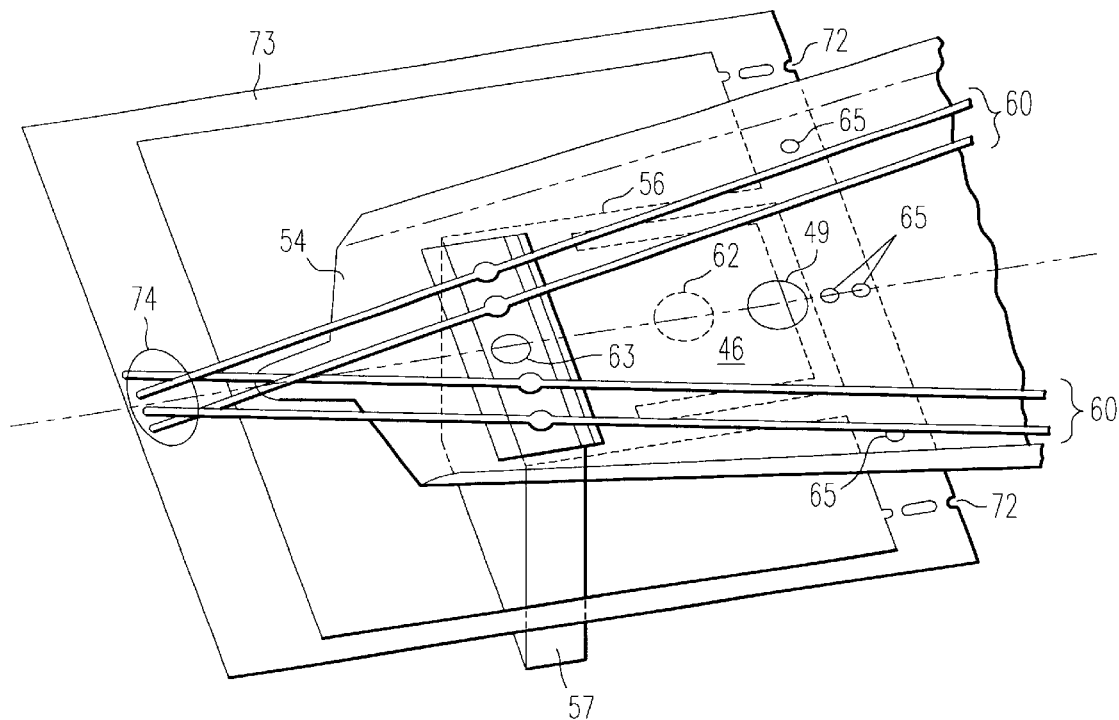
FIG. 10 shows the positional relationship of the slider, the flexure and the load beam positioned in a positioning jig.

In the step 81 in the FIG. 9, the slider 57 is placed or positioned on the positioning jig, as shown in the FIG. 10(A), and in a step 82, the flexure 54 with the frame member 73 is placed in the positioning jig. In a step 83, the connecting wires 60 are fixed at an area 74 on the frame member 73 to position the wires 60 on the connecting terminals on the thin film 36, respectively, and the wires 60 are connected to the terminals by an ultrasonic bonding, as well known in the art, whereby the wires 60 are connected to the MR head 63. Next, unnecessary portions of the wires 60 are cut and the frame member 73 is separated at the cutout portions 72.

Figure 10B:
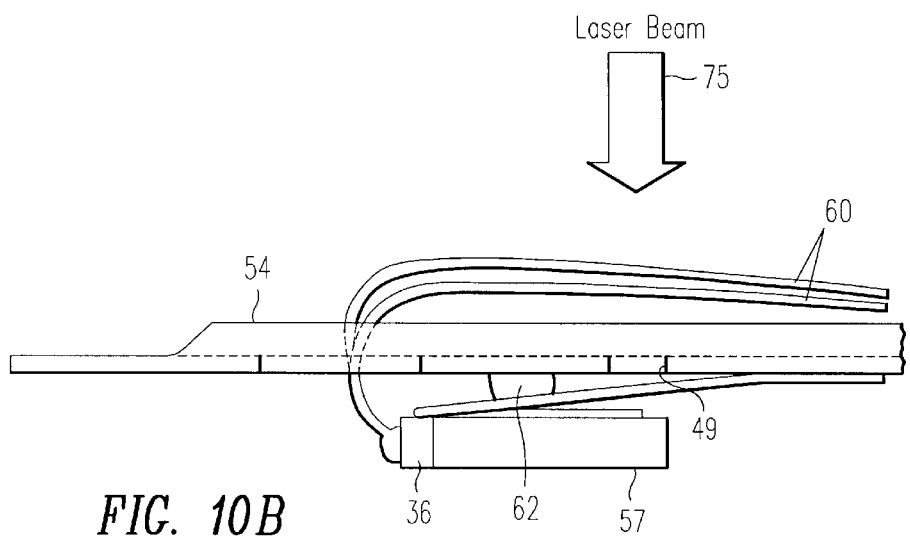

In a step 84, the thermosetting adhesive, such as a thermosetting epoxy resin, is applied on the slider 57, and the slider 57 is rotated by ninety degrees, as shown in the FIG. 10(B), to bring the bonding portion 56A of the flexure 56 into contact with the slider 57. The area 70 of the upper surface of the slider 57 shown in the FIG. 8 shows the adhesive. It is noted that the thermosetting adhesive is not shown in the FIG. 10(B).

In a step 85, a continuous wave laser beam 75 is directed, for a predetermined period, to the exposed portion of the upper surface including the edge 56B of the bonding portion 56A of the flexure 56 and the exposed portion of the upper surface of the slider 57 through the aperture 49 of the load beam 54, so that a small portion 71 of the thermosetting adhesive 70 shown in the FIG. 8 is cured, whereby the slider 57 is tacked to the bonding portion 56A of the flexure 56 by the small portion 71 of the cured thermosetting adhesive.

In a step 86, the head supporting arm 51 is removed or unloaded from the positioning jig. In a step 88, the head supporting arm 51 is heated in a heating oven at a temperature of about 120 degrees centigrade, during about 30 minutes to cure the entire thermosetting adhesive 70 between the bonding portion 56A of the flexure 56 and the slider 57.

As described before, the aperture 49 is formed at the position which satisfies the conditions (1) and (2). In the condition (1), the aperture 49 is formed at the position which simultaneously exposes both a portion of the upper surface including the edge 56B of the bonding portion 56A and a portion of the upper surface of the slider. The reason for simultaneously exposing both a portion of the upper surface including the edge 56B of the bonding portion 56A and a portion of the upper surface of the slider is to simultaneously heats both the portion of the upper surface including the edge 56B of the bonding portion 56A and portion of the upper surface of the slider by the laser beam 75, as shown in the FIG. 10(A), whereby the thermosetting adhesive in the small area 71 can be effectively cured, and the slider 57 can be firmly tacked to the bonding portion 56A of the flexure 56.

The reason for using the condition (2), that is, the aperture 49 is formed at the position which is located between the dimple 62 and an edge 57B of the slider 57 which is the opposite side to an edge 57A of the slider 57 to which the read/write head 63 is attached, is to prevent the MR head 63 from being damaged by the heat applied by the laser beam. A part of the heat applied at such position is transferred to the load beam 54 through the dimple 62 located in the heat transfer path between such position and the read/write head 63. In this manner, the dimple 62 formed by pressing the load beam 54 made of the resilient heat conductive material, such as resilient stainless alloy, operates as a radiating path. The heat higher than 120 degrees centigrade tends to damage the MR head, and hence it is necessary to prevent the heat higher than 120 degrees centigrade from being applied to the MR head. For this reason, the temperature in the oven in the step 88 is maintained at a value lower than 120 degrees centigrade to prevent the MR head 63 from being damaged.

Figure 1:
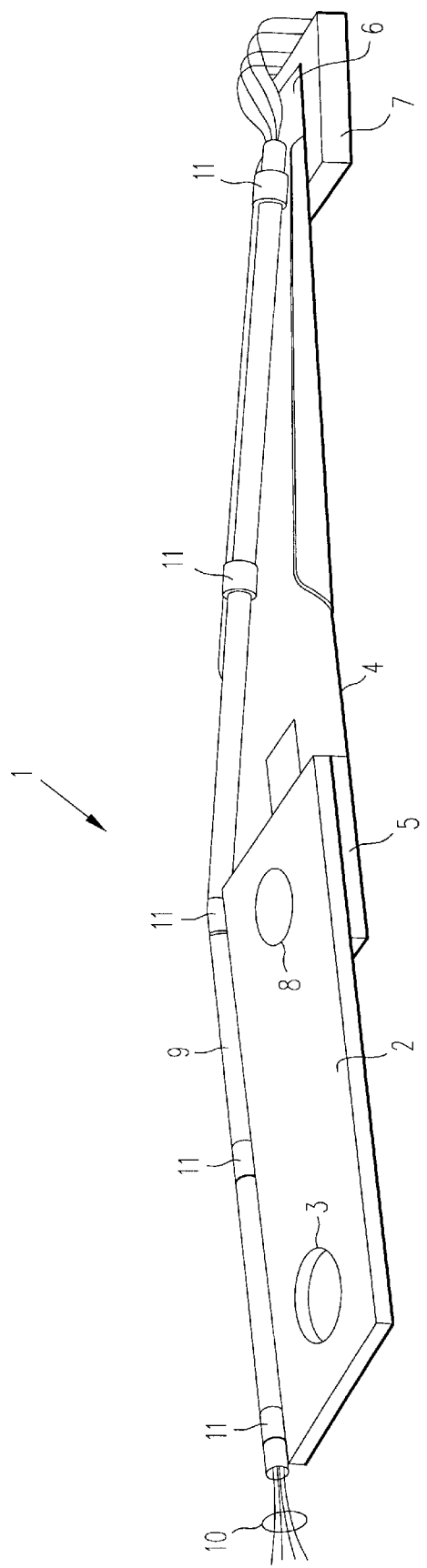
FIG. 1 shows a prior head supporting arm.
Figure 2:
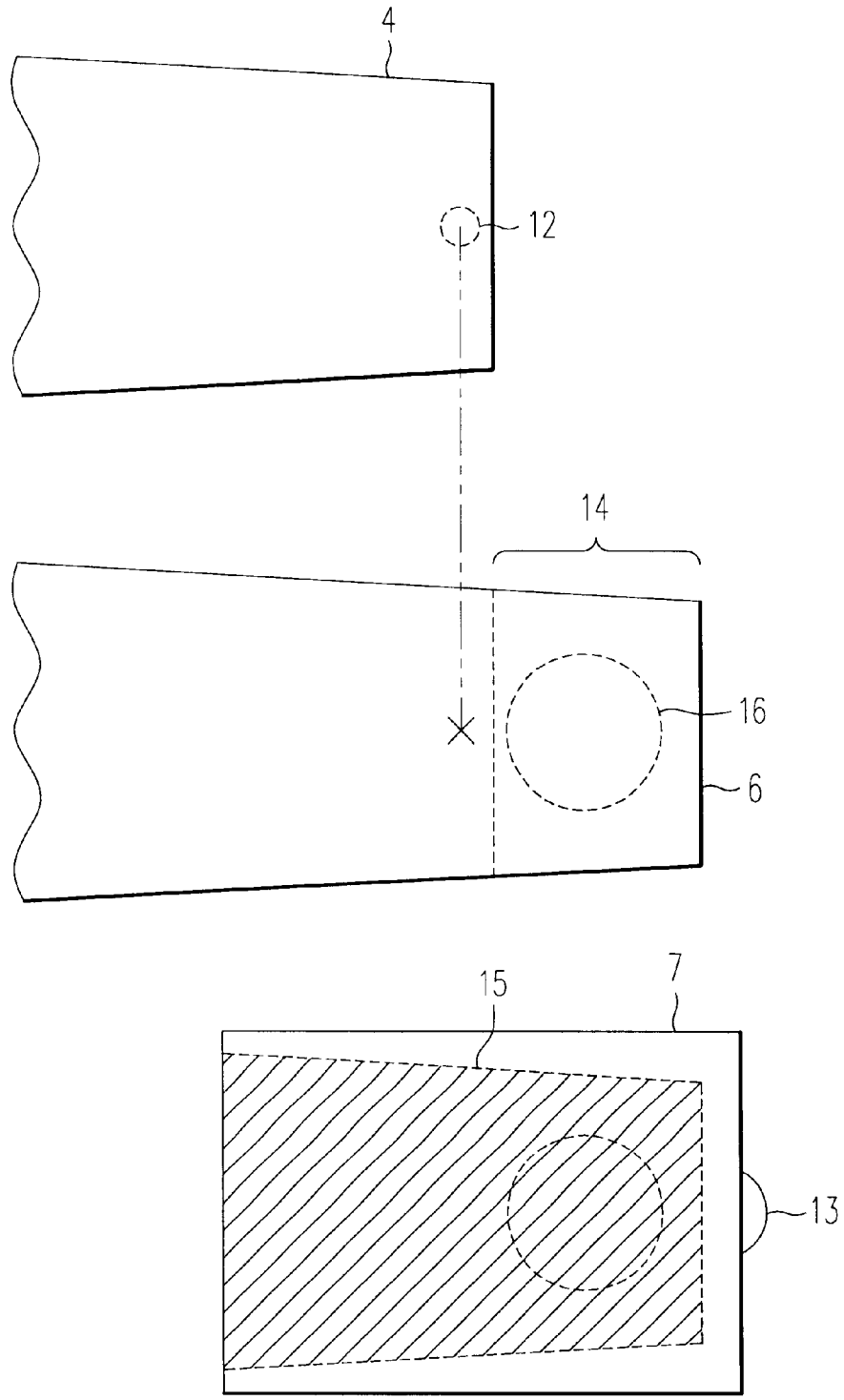
FIG. 2 shows a positional relationship of a front end of the load beam, the flexure and the slider.
Figure 3:
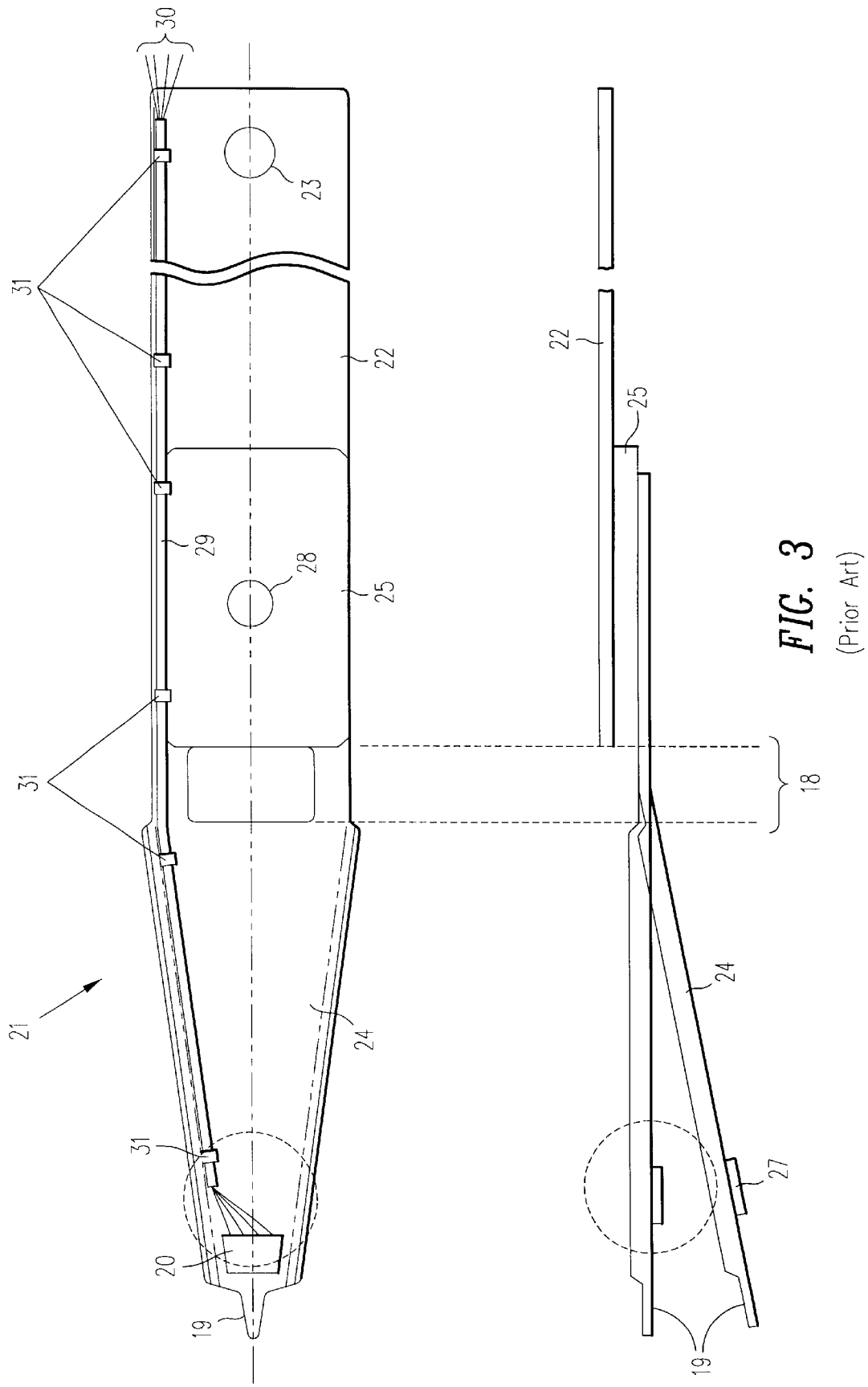
FIG. 3 shows a prior head supporting arm used in the load/unload scheme.
Figure 4A:
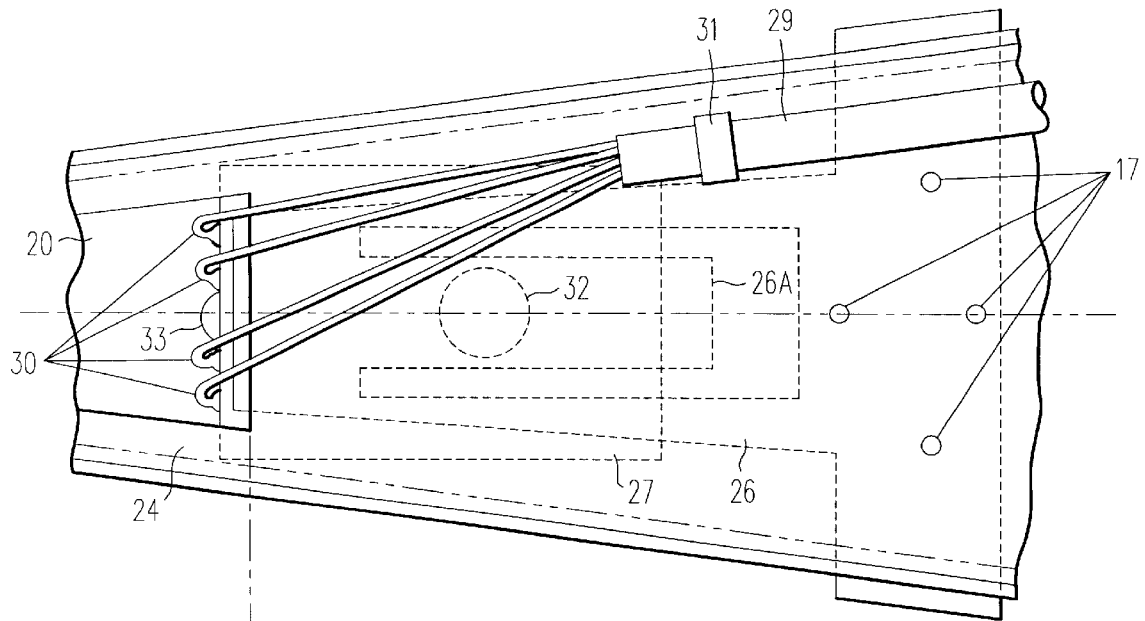
FIG. 4 shows a detail of the front portion of the head supporting arm shown in the FIG. 3.
Figure 4B:
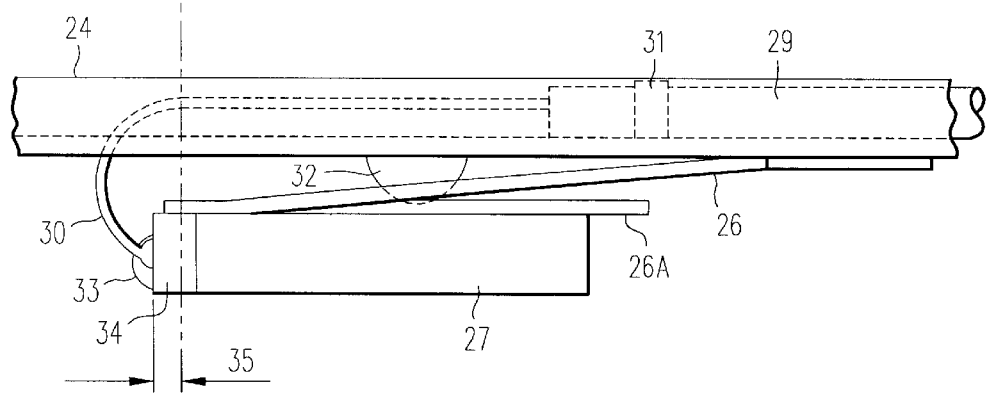

The present invention makes the use of the thermosetting adhesive, such as the epoxy resin, in the assembling of the head supporting arm 51 possible by using the above structure. The reason for using the thermosetting adhesive, such as the epoxy resin, in the present invention is that the thermosetting adhesive, particularly the epoxy resin, has a low glass transition temperature in the range of a room temperature of about 20 degrees centigrade in comparison with the cyanoacrylate adhesive. Since the operating temperature of the hard disk drive device is usually higher than the glass transition temperature of the epoxy resin, the epoxy resin is maintained in the rubber like elastic state with a relatively low Young's modulus, so that any difference between the expansion of the bonding portion 56A of the flexure 56 made of stainless alloy and the expansion of the slider 57 made of alumina titanium carbide can be absorbed by the rubber like elastic adhesive, whereby the present invention can prevent the bimetal effect in the prior head supporting arm shown in the FIGS. 3 and 4 from being occurred, and hence the flying height of the read/write head or the MR head 63 can be maintained at a constant designed value over the operating temperature of the hard disk drive device.

Figure 11A:
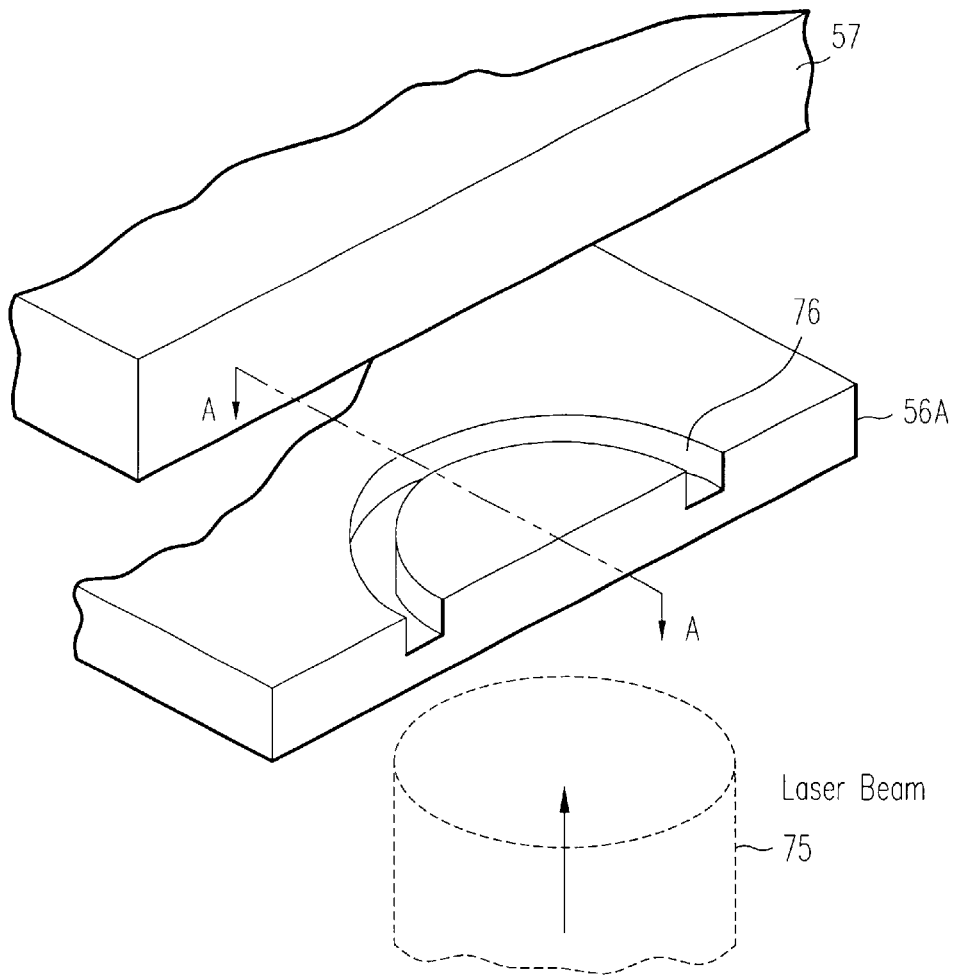
FIG. 11 shows the structure of the bonding portion in another embodiment of the present invention.
Figure 11B:
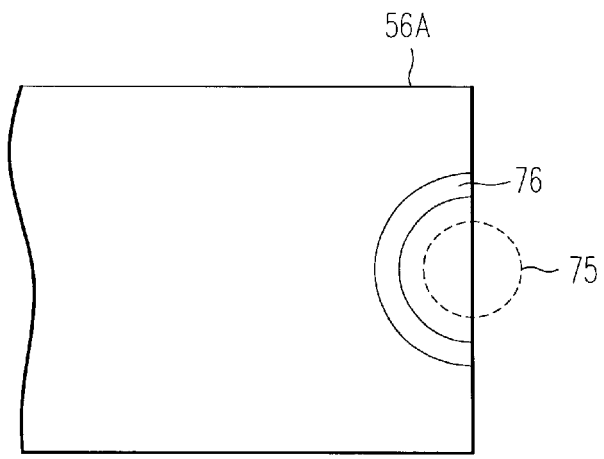

FIG. 11 shows the structure of the bonding portion 56A in the embodiment of the present invention. The FIG. 11(A) and 11(B) show a perspective view and a plan view of the bonding portion 56A, respectively. In the FIG. 11(A), the slider 57 is shown as separated from the bonding portion 56A and the adhesive is not shown for simplifying the drawing. In this embodiment, a groove 76 extending along a semicircular path or trace to surround a region heated by the laser beam passing through the aperture 49 is formed on the surface, which faces to the slider 57, of the bonding portion 56A of the flexure 56 to prevent the heat of the laser beam 75 from being transferred, in a direction parallel to the surface of the bonding portion 56A, from the region surrounded by the semi circularly extending groove 76 to the remaining portion of the boning portion 56A, and to increase the heat transfer from the region surrounded by the semi circularly extending groove 76 to the adhesive and the slider 57, whereby the adhesive sandwiched between the region surrounded by the groove 76 and the slider 57 can be reliably cured to realize the reliable laser tack.

Figure 12A:
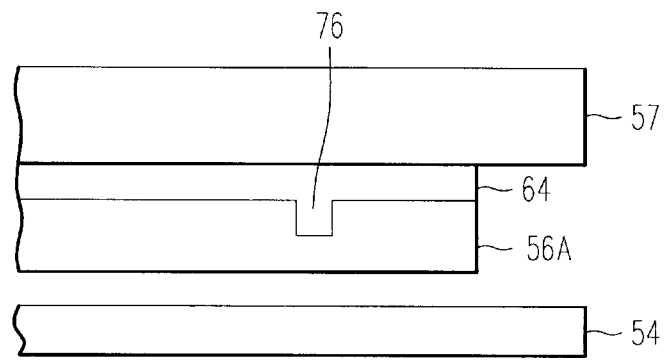
FIG. 12 shows cross sections of the bonding portion, the thermosetting adhesive and the slider along a line A—A in the FIG. 11.
Figure 12B:
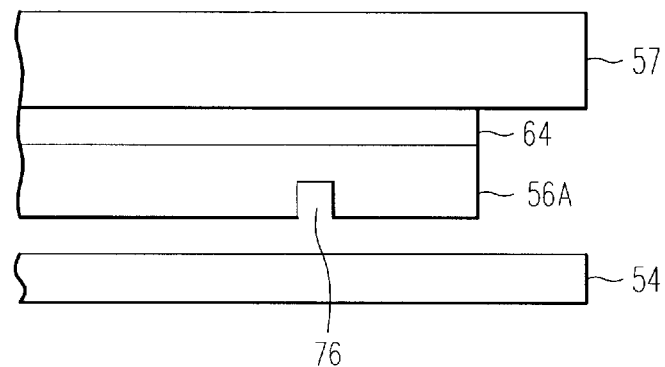

FIG. 12 shows cross sections of the load beam 54, the bonding portion 56A, the thermosetting adhesive 64 and the slider 57 along a line A—A in the FIG. 11(A). As shown in the FIGS. 11(A) and 11(B) and the FIG. 12(A), the groove 76 extending along the semicircular path or trace is formed on the surface, facing to the slider 57, of the bonding portion 56A of the flexure 56, and the groove 76 is filled with thermosetting adhesive 64. The groove may be formed by a masking and etching process well known in the art. The FIG. 12(B) shows an alternative structure to the structure shown in the FIG. 12(A). The groove 76 is formed on the surface of the bonding portion 56A, which opposes to the slider 57, and the groove 76 is filled with the air. Since a heat transmission coefficient of the air is lower than that of the thermosetting adhesive, the structure shown in the FIG. 12(B) can improve the heat transfer toward the slider 57 in the perpendicular direction to the surface of the bonding portion 56A.

Figure 13:
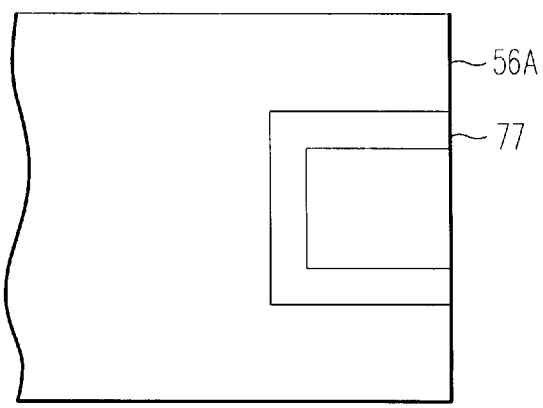
FIG. 13 shows an alternative structure of the region of the bonding portion onto which the laser beam is directed.
Figure 14:
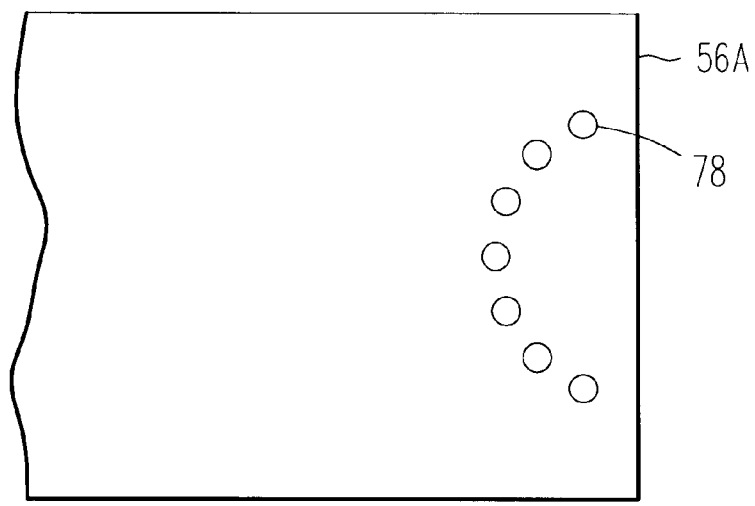
FIG. 14 shows an alternative structure of the region of the bonding portion onto which the laser beam is directed.
Figure 15:
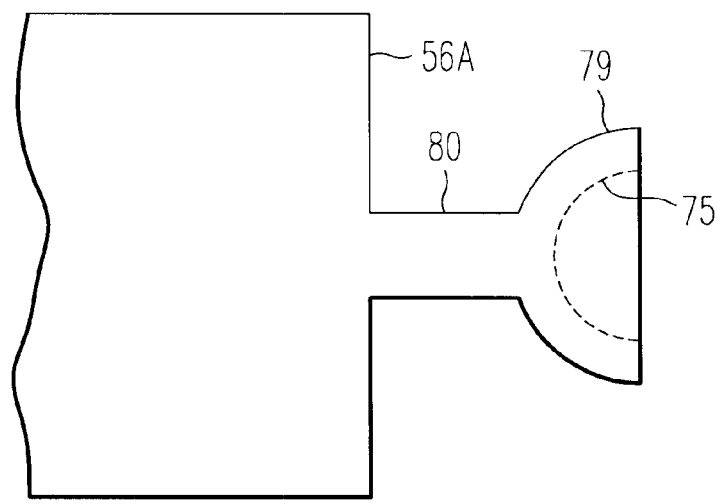
FIG. 15 shows an alternative structure of the region of the bonding portion onto which the laser beam is directed.

FIGS. 13, 14 and 15 show alternative structures of the region of the bonding portion 56A which is illuminated by the laser beam. In the FIG. 13, the groove 77 extending along a half rectangular path or trace to surround the region illuminated by the laser beam is formed on the surface of the bonding portion 56A of the flexure 56.

In the FIG. 14, a plurality of apertures 78 along a half circular rectangular path or trace to surround the region illuminated by the laser beam are formed on the surface of the bonding portion 56A of the flexure 56. Each of the apertures 78 penetrates the bonding portion 56A, or each of the apertures 78 is replaced by a blind hole. The plural apertures 78 can be formed along the half rectangular path.

In the FIG. 15, an island like region 79 connected to the main body of the bonding portion 56A of the flexure 56 through a neck portion 80 is formed in place of the structures shown in the FIGS. 11(B), 13 and 14. A portion shown by dashed line in the island like portion 79 is exposed by the exposing aperture 49 and is illuminated by the laser beam 75. An amount of the heat of the laser beam 75 transferred from the island like region 79 to the main body of the bonding portion 56A is limited by the small neck portion 80, and hence it is possible to increase the heat transfer from the island like region 79 to the adhesive, whereby the adhesive sandwiched between the region 79 and the slider 57 is effectively cured.

Although the epoxy resin is used in the embodiments of the present invention as the thermosetting adhesive having a low glass transition temperature in the range of a room temperature of about 20 degrees centigrade, another thermosetting adhesive having the above characteristic can be used.

Although the exposing aperture 49 is formed to expose the edge 56B of the bonding portion 56A in the embodiment of the present invention, the exposing aperture can be formed to expose a side edge 56C of the bonding portion 56A, as shown by the reference number 49A in the FIG. 8.

The present invention can realize an improved laser tack of the head supporting arm in which substantially all surface of the bonding portion 56A of the flexure 56 facing to the load beam 54 is hidden by the load beam 54 when the upper surface of the load beam 54 is viewed in a direction toward the upper surface. The present invention can realizes the structure of the head supporting arm for preventing the read/write head from being damaged during the heating process for bonding the slider to the flexure and the method for fabricating the head supporting arm with preventing the read/write head from being damaged during the heating process.

What is claimed is:

1. A suspension system comprising:
   a load beam;
   a flexure having a portion coupled to said load beam and a bonding portion, the flexure including a heat transfer limiter located between the bonding portion and the rest of the flexure, the bonding portion being a peninsula member which extends from the flexure, the limiter being an area of the bonding portion having a reduced cross-section, the bonding portion of said flexure including an edge placed on a surface of a slider;
   a slider bonded on said bonding portion by an adhesive; and
   the load beam having an exposing aperture, which exposes both a portion of a surface region, including said one edge, of said bonding portion and a portion of said surface of said slider.

2. The system of claim 1, wherein a dimple is formed on said load beam to provide a gimbal action of said flexure and said slider, and said exposing aperture is formed on said load beam at a position that is located between said dimple and one surface of said slider which is the opposite side to a surface of said slider at which a read/write head is attached.

3. The system of claim 2, wherein said exposing aperture is formed on said load beam at a position for exposing both a portion of a surface region including one edge of said bonding portion adjacent to said one edge of said slider and a portion of said surface of said slider.

4. The system of claim 1, wherein the heat transfer limiter comprises a groove surrounding said bonding portion.

5. The system of claim 4, wherein said groove is formed on a surface of the flexure facing said slider.

6. The system of claim 4, wherein said groove is formed on a surface of said flexure facing the load beam.

7. The system of claim 4, wherein said groove extends along a substantially semicircular path surrounding said bonding portion.

8. The system of claim 4, wherein said groove extends along a substantially half rectangular path surrounding said bonding portion.

9. The system of claim 1, wherein the heat transfer limiter comprises a plurality of apertures surrounding said bonding portion.

10. The system of claim 9, wherein said plurality of apertures are formed along a substantially semicircular path surrounding said bonding portion.

11. The system of claim 1, wherein the heat transfer limiter comprises a neck portion which connects the bonding portion with the rest of the flexure.

12. A data storage system comprising:
    a data storage medium for storing data;
    a suspension system positioned proximate to the data recording medium, the suspension system comprising:
      a load beam;
      a flexure having a portion coupled to said load beam and a bonding portion, the flexure including a heat transfer limiter located between the bonding portion and the rest of the flexure, the bonding portion being a peninsula member which extends from the flexure, the limiter being an area of the bonding portion having a reduced cross-section, the bonding portion of said flexure including an edge placed on a surface of a slider;
      said slider bonded on said bonding portion by an adhesive; and
      the load beam having an exposing aperture, which exposes both a portion of a surface region, including said one edge, of said bonding portion and a portion of said surface of said slider.

13. The system of claim 12, wherein a dimple is formed on said load beam to provide a gimbal action of said flexure and said slider, and said exposing aperture is formed on said load beam at a position that is located between said dimple and one surface of said slider which is the opposite side to a surface of said slider at which a read/write head is attached.

14. The system of claim 13, wherein said exposing aperture is formed on said load beam at a position for exposing both a portion of a surface region including one edge of said bonding portion adjacent to said one edge of said slider and a portion of said surface of said slider.

15. The system of claim 12, wherein the heat transfer limiter comprises a groove surrounding said bonding portion.

16. The system of claim 15, wherein said groove is formed on a surface of the flexure facing said slider.

17. The system of claim 15, wherein said groove is formed on a surface of said flexure facing the load beam.

18. The system of claim 15, wherein said groove extends along a substantially semicircular path surrounding said bonding portion.

19. The system of claim 15, wherein said groove extends along a substantially half rectangular path surrounding said bonding portion.

20. The system of claim 12, wherein the heat transfer limiter comprises a plurality of apertures surrounding said bonding portion.

21. The system of claim 20, wherein said plurality of apertures are formed along a substantially semicircular path surrounding said bonding portion.

22. The system of claim 12, wherein the heat transfer limiter comprises a neck portion which connects the bonding portion with the rest of the flexure.

23. A head supporting arm comprising:
    a load beam;
    a flexure including a portion coupled to said load beam and a bonding portion;
    a slider bonded on said bonding portion by an adhesive;
    wherein said bonding portion of said flexure includes an edge placed on a surface of said slider; and
    wherein an exposing aperture, which exposes both a portion of a surface region, including said one edge, of said bonding portion and a portion of said surface of said slider, is formed on said load beam, a plurality of apertures surrounding said portion of said bonding portion exposed by said exposing aperture are formed on said bonding portion, said plural apertures are formed along a substantially semicircular path surrounding said portion exposed by said exposing aperture.

* * * * *